United States Patent
Mickle et al.

(10) Patent No.: US 8,213,201 B2
(45) Date of Patent: Jul. 3, 2012

(54) MOTION ACTIVATED AMPLIFIER

(75) Inventors: Marlin H. Mickle, Pittsburgh, PA (US); Peter Hawrylak, Woodstown, NJ (US)

(73) Assignee: University of Pittsburgh—Of the Commonwealth Systems of Higher Education, Pittsburgh, PA (US)

( * ) Notice: Subject to any disclaimer, the term of this patent is extended or adjusted under 35 U.S.C. 154(b) by 459 days.

(21) Appl. No.: 12/481,899

(22) Filed: Jun. 10, 2009

(65) Prior Publication Data

US 2009/0310393 A1   Dec. 17, 2009

Related U.S. Application Data

(60) Provisional application No. 61/060,525, filed on Jun. 11, 2008.

(51) Int. Cl.
*H02M 7/00*  (2006.01)

(52) U.S. Cl. ......................................... 363/124; 363/125

(58) Field of Classification Search ................... 363/126, 363/170, 15, 34, 37, 124, 125
See application file for complete search history.

(56) References Cited

U.S. PATENT DOCUMENTS

| | | | |
|---|---|---|---|
| 5,001,618 A | 3/1991 | Laeuffer | |
| 5,667,290 A | 9/1997 | Cioletti et al. | |
| 5,856,727 A | 1/1999 | Schroeder et al. | |
| 5,952,913 A | 9/1999 | Cioletti et al. | |
| 7,021,787 B1 * | 4/2006 | Kuelbs | 362/183 |
| 7,116,012 B2 * | 10/2006 | Kajouke et al. | 307/64 |
| 7,315,004 B1 * | 1/2008 | Jarzynka et al. | 200/61.45 R |
| 7,317,303 B1 | 1/2008 | Devilbliss et al. | |
| 7,868,482 B2 * | 1/2011 | Greene et al. | 307/82 |
| 2006/0158908 A1 * | 7/2006 | Usui | 363/15 |
| 2007/0153561 A1 * | 7/2007 | Mickle et al. | 363/170 |
| 2007/0173214 A1 | 7/2007 | Mickle et al. | |
| 2007/0291514 A1 * | 12/2007 | Shen et al. | 363/15 |
| 2008/0062589 A1 * | 3/2008 | Drabing | 361/37 |
| 2009/0206759 A1 * | 8/2009 | Wang et al. | 315/151 |

\* cited by examiner

*Primary Examiner* — Adolf Berhane
*Assistant Examiner* — Emily Pham
(74) *Attorney, Agent, or Firm* — Eckert Seamans Cherin & Mellott, LLC; Philip E. Levy

(57) ABSTRACT

An electronic device that includes a motion activated amplifier structured to receive a first DC signal having a first DC voltage level and output a second DC signal having a second DC voltage level that is greater than the first DC voltage level. The motion activated amplifier includes a motion activated switch operatively coupled to transformer/rectifier circuitry, wherein the motion activated switch is structured to receive the first DC signal and in response to being moved output an AC signal, and wherein the transformer/rectifier circuitry is structured to receive the AC signal and convert the AC signal into the second DC signal.

13 Claims, 3 Drawing Sheets

MOTION ACTIVATED AMPLIFIER

CROSS-REFERENCE TO RELATED APPLICATION

This application claims the benefit of U.S. Provisional Application No. 61/060,525, entitled "Motion Activated Amplifier," which was filed on Jun. 11, 2008, the disclosure of which is incorporated herein by reference.

FIELD OF THE INVENTION

The present invention relates to the powering of electronic devices, such as wireless electronic devices, and/or the charging of energy storage devices of electronic devices, such as wireless electronic devices, including electronic devices that harvest RF energy transmitted through the air and convert it to DC energy, and in particular to a method and apparatus for amplifying DC energy that is motion activated.

BACKGROUND OF THE INVENTION

A wireless autonomous device (WAD) is an wireless electronic device that has no on board battery or wired power supply. WADs are powered by receiving radio frequency (RF) energy that is either directed toward them (a directed source) or is ambient and converting the received RF energy into a direct current (DC) voltage. The DC voltage is used to power on-board electronics, such as a microprocessor and/or sensing circuitry, and an RF transmitter which communicates information, such as a sensor reading, to a remote receiver. WADs are employed in a number of fields, such as radio frequency identification (RFID) systems (wherein the WADs are radio frequency tags or transponders), security monitoring and remote sensing, among others. WADs are particularly desirable in certain applications as they have essentially an infinite shelf life and do not require wiring because, as described above, they are powered by RF energy transmitted through the air.

Due to the physical nature of such RF waves and the regulations of the FCC, the field strength (volts/meter) of the waves is limited. As a result, one of the problems associated with energy harvesting for WADs has been that the magnitude of the generated DC voltage (i.e., of the rectified wave) is not sufficient to cause transistors in the electronic circuits of the WADs to switch (i.e., turn on and off). One technique that has been used to increase the available DC voltage is the use of multiple voltage doublers or charge pumps in the energy harvesting circuitry, where each voltage double/charge pump stage is able to produce a DC voltage of n times the input. The specific value of n will depend upon the particular circuit design. While effective to some degree, this technique has limitations due to diminishing returns resulting from various voltage drops across the diodes employed in such an implementation. There is thus a need for a technique for increasing the available DC voltage in RF energy harvesting or other suitable applications.

SUMMARY OF THE INVENTION

In one embodiment, the present invention provides an electronic device that includes a motion activated amplifier structured to receive a first DC signal having a first DC voltage level and output a second DC signal having a second DC voltage level that is greater than the first DC voltage level. The motion activated amplifier includes a motion activated switch operatively coupled to transformer/rectifier circuitry, wherein the motion activated switch is structured to receive the first DC signal and in response to being moved output an AC signal, and wherein the transformer/rectifier circuitry is structured to receive the AC signal and convert the AC signal into the second DC signal.

In one particular embodiment, the electronic device is a wireless electronic device that includes energy harvesting circuitry for receiving RF energy and converting the RF energy into the first DC signal. The energy harvesting circuitry may include an antenna for receiving the RF energy, a matching network operatively coupled to the antenna, and a charge pump operatively coupled to the matching network for converting the RF energy into the first DC signal.

The second DC voltage signal output from the motion activated amplifier may directly power one or more electronic components of the electronic device. Alternatively, the second DC voltage signal may charge an energy storage device that is structured to provide power to one or more electronic components of the electronic device.

In one particular embodiment, the device includes a second motion activated amplifier structured to receive the second DC signal and output a third DC signal having a third DC voltage level that is greater than the second DC voltage level, wherein the second motion activated amplifier includes a second motion activated switch operatively coupled to second transformer/rectifier circuitry, wherein the second motion activated switch is structured to receive the second DC signal and in response to being moved output a second AC signal, and wherein the second transformer/rectifier circuitry is structured to receive the second AC signal and convert the second AC signal into the third DC signal.

In addition, the second DC voltage signal may charge a first energy storage device, and the electronic device may further include a second motion activated amplifier structured to receive a third DC signal having a third DC voltage level from the first energy storage device and output a fourth DC signal having a fourth DC voltage level that is greater than the third DC voltage level. The second motion activated amplifier includes a second motion activated switch operatively coupled to second transformer/rectifier circuitry, wherein the second motion activated switch is structured to receive the third DC signal and in response to being moved output a second AC signal, wherein the second transformer/rectifier circuitry is structured to receive the second AC signal and convert the second AC signal into the fourth DC signal, and wherein the fourth DC voltage signal charges a second energy storage device.

In another embodiment, the invention provides a method of generating a voltage signal that includes receiving a first DC signal having a first DC voltage level, converting the first DC signal into an AC signal based on and in response to motion, and converting the AC signal into a second DC signal having a second DC voltage level that is greater than the first DC voltage level. The converting the first DC signal into an AC signal may comprise chopping the first DC signal based on and in response to motion. The converting the AC signal into a second DC signal may comprise stepping up a voltage of the AC signal to create a stepped-up AC signal, and rectifying the stepped-up AC signal to create the second DC signal. The method may further include receiving RF energy form the ambient environment and converting the RF energy into the first DC signal.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
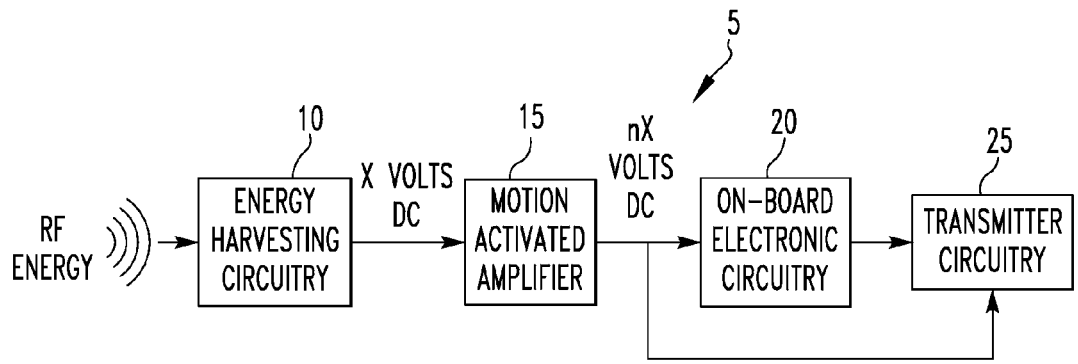
FIG. 1 is a block diagram of a wireless autonomous device implemented in accordance with one embodiment of the invention.

FIG. 1 is a block diagram of a wireless autonomous device (WAD) 5 implemented in accordance with one embodiment of the invention. The WAD 5 includes energy harvesting circuitry 10 that is operatively coupled to a motion activated amplifier 15, which in turn is operatively coupled to on-board electronic circuitry 20, which in turn is operatively coupled to transmitter circuitry 25. In operation, the energy harvesting circuitry 10 is structured to receive RF energy of a particular RF frequency range and, as described in greater detail below, harvest energy therefrom by converting the received RF energy into DC energy, e.g., a DC voltage. As used herein, the term "RF frequency range" or "frequency range" shall refer to either a single RF frequency or a band of multiple RF frequencies. The RF energy may be transmitted by a directed RF source (not shown), such as an RFID reader, or may be present in the ambient environment, such as in the form of AM radio waves. The DC voltage is then, as described in detail below, amplified by the motion activated amplifier 15. The amplified DC voltage is used to power the on-board electronic circuitry 20 and the transmitter circuitry 25. The transmitter circuitry 25 in the present embodiment is structured to transmit an RF information signal to a receiving device, preferably at a frequency range that is different from the frequency range of the RF energy received by the energy harvesting circuitry 10. The RF information signal may, for example, include data that identifies the WAD 5 and/or data that is sensed by a component provided as part of the on-board electronic circuitry 20.

The on-board electronic circuitry 20 may include, for example, a processing unit, such as, without limitation, a microprocessor, a microcontroller or a PIC processor, additional logic circuitry, and a sensing circuit for sensing or measuring a particular parameter (such as temperature, in which case a thermistor may be included in the sensing circuit). As described above, these components are powered by the DC voltage output by the motion activated amplifier 15. In addition, the transmitter circuitry 25 preferably includes an RF transmitter, which may be formed from discrete components or provided as a single IC chip, and a transmitting antenna. As described above, the transmitter circuitry 25 is also powered by the DC voltage output by the motion activated amplifier 15 and is structured to transmit an RF information signal, preferably (although not necessarily) at a frequency that is different from the frequency range of the RF energy received by the energy harvesting circuitry 10, based on information generated by the on-board electronic circuitry 20. For example, the transmitter circuitry 25 may transmit an RF signal that represents a temperature as measured by a thermistor provided as part of the on-board electronic circuitry 20.

Figure 2:
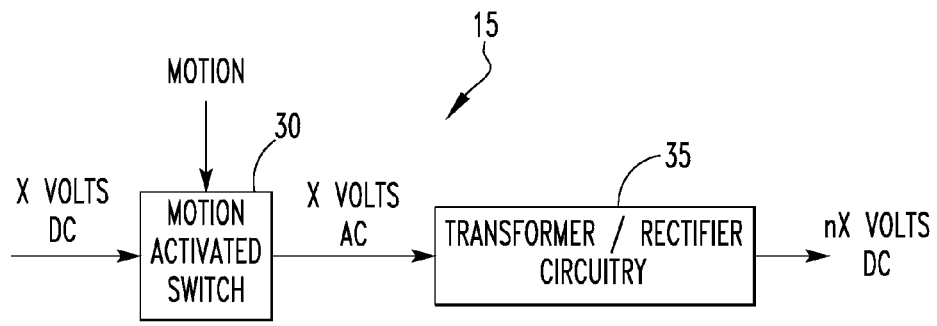
FIG. 2 is a block diagram of one particular embodiment of the motion activated amplifier forming a part of the wireless autonomous device of FIG. 1.

FIG. 2 is a block diagram of one particular embodiment of the motion activated amplifier 15. As seen in FIG. 2, the motion activated amplifier 15 receives from the energy harvesting circuitry 10 a DC voltage having a voltage level of X volts. The motion activated amplifier 15 includes a motion activated switch 30 operatively coupled to transformer/rectifier circuitry 35. The motion activated switch 30 is structured to move back and forth between an open state and a closed state in response to being put into motion (i.e., in response to the WAD 5 and thus the motion activated energy amplifier 15 being moved). In other words, the motion activated switch 30 produces alternating conducting and non-conducting paths when the motion activated switch 30 is subjected to motion. As stated above, the motion activated switch 30 receives the DC voltage that is output by the energy harvesting circuitry 10. As a result, when subjected to motion, the alternating open and closed states of the motion activated switch 30 will "chop" the DC voltage received from the energy harvesting circuitry 10 and produce an AC voltage having an amplitude of X volts at the output of the motion activated switch 30.

One suitable example of a switch that may be used as the motion activated switch 30 is described in U.S. Pat. No. 7,315,004, entitled "Motion-Activated Electrical Switch," the disclosure of which is incorporated herein by reference. It is to be understood, however, that this is meant to be exemplary only, and that other suitable switching devices that move from a closed, conducting state to an open, non-conducting state in response to motion may also be used. In addition, the motion activated switch 30 is, in the preferred embodiment, normally open, meaning that the DC voltage will not be shorted to the transformer/rectifier circuitry 35 when the motion activated switch 30 is not subjected to movement (i.e., is at rest).

As seen in FIG. 2, the output of the motion activated switch 30 is operatively coupled to the input of the transformer/rectifier circuitry 35 so that the AC voltage that is generated is input thereto. The transformer/rectifier circuitry 35 includes a step-up transformer having a 1:n turns ratio that is operatively coupled to a suitable rectifier circuit. As a result, the AC voltage (having an amplitude of X volts) input into the transformer/rectifier circuitry 35 will first be stepped-up to an AC voltage having an amplitude of nX volts by the step-up transformer, and then that stepped up AC voltage will be rectified into a DC voltage having a magnitude of nX volts by the rectifier circuit. That DC voltage is output by the motion activated amplifier 15 and provided to the on-board electronic circuitry 20 and the transmitter circuitry 25 (FIG. 1). Thus, the motion activated amplifier 15 is able to increase the voltage level of the DC voltage signal that is generated from the RF energy received by the energy harvesting circuitry 10 to a level that is more suitable for operation of the on-board electronic circuitry 20 and the transmitter circuitry 25.

Figure 3:
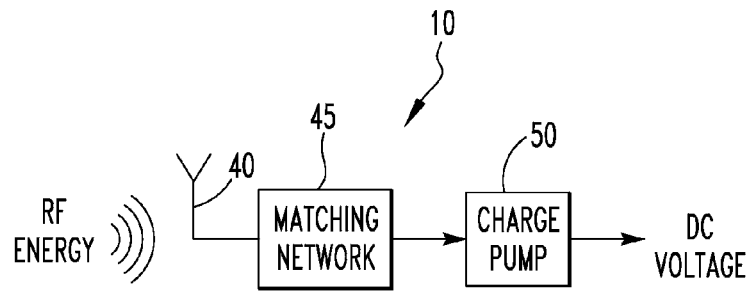
FIG. 3 is a block diagram of one particular embodiment of the energy harvesting circuitry forming a part of the wireless autonomous device of FIG. 1.

FIG. 3 is a block diagram of one particular, non-limiting embodiment of the energy harvesting circuitry 10 that may be employed in the WAD 5. As seen in FIG. 3, this embodiment of the energy harvesting circuitry 10 includes an antenna 40 which is electrically connected to a matching network 45, which in turn is electrically connected to a voltage boosting and rectifying circuit preferably in the form of a one or more stage charge pump 50. Charge pumps are well known in the art. Basically, one stage of a charge pump significantly increases the effective amplitude of an AC input voltage with the resulting increased DC voltage appearing on an output capacitor. The voltage could also be stored using a rechargeable battery. Successive stages of a charge pump, if present, will essentially increase the voltage from the previous stage resulting in an increased output voltage. In operation, the antenna 40 receives the RF energy (FIG. 2) and provides that RF energy, in the form of an AC signal, to the charge pump 50 through the matching network 45. The charge pump 50 rectifies the received AC signal to produce a DC signal that is amplified as compared to what it would have been had a simple rectifier been used. In one particular embodiment, the matching network 45 is chosen (i.e., its impedance is chosen) so as to maximize the voltage of the DC signal output by charge pump 50. In other words, the matching network 45 matches the impedance of the antenna 40 to the charge pump 50 solely on the basis of maximizing the DC output of the charge pump 50. In the preferred embodiment, the matching network 45 is an LC circuit of either an L topology (which includes one inductor and one capacitor) or a π topology (which includes one inductor and two capacitors) wherein the inductance of the LC circuit and the capacitance of the LC circuit are chosen so as to maximize the DC output of the charge pump 50. In one embodiment, an LC tank circuit may be formed by the inherent distributed inductance and inherent distributed capacitance of the conducing elements of the antenna 40, in which case the antenna is designed and laid out in a manner that results in the appropriate chosen L and C values. Furthermore, the matching network 45 may be chosen so as to maximize the output of the charge pump 50 using a trial and error ("annealing") empirical approach in which various sets of inductor and capacitor values are used as matching elements in the matching network 45, and the resulting output of the charge pump 50 is measured for each combination, and the combination that produces the maximum output is chosen.

Figure 4:
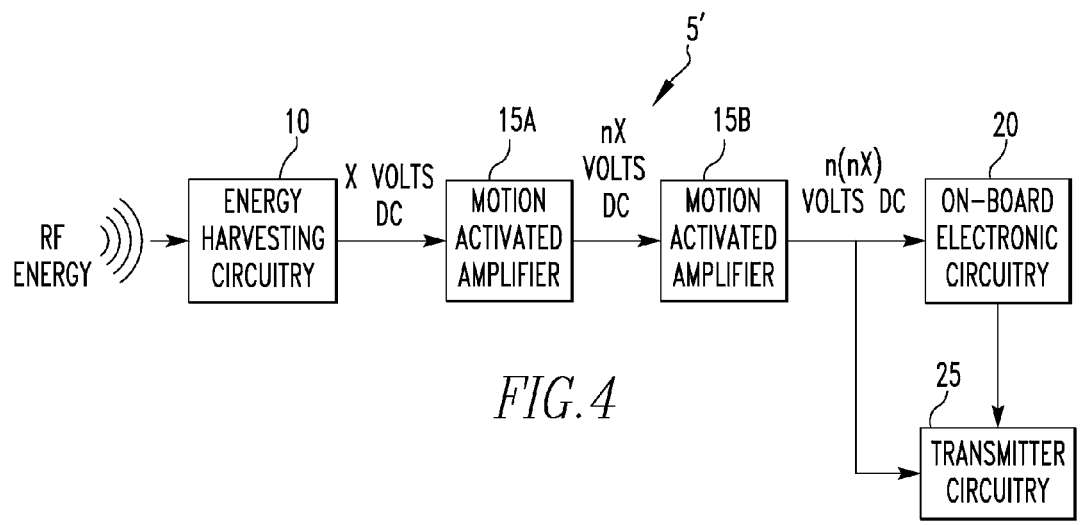
FIG. 4 is a block diagram of a wireless autonomous device implemented in accordance with another embodiment of the invention.

FIG. 4 is a block diagram of an alternate embodiment of a wireless autonomous device (WAD) 5'. The WAD 5' is similar to the WAD 5 shown in FIG. 1, with the difference being that the WAD 5' includes two cascaded motion activated amplifiers 15A and 15B which are operatively coupled to the on-board electronic circuitry 20 and the transmitter circuitry 25. In particular, the output of the motion activated amplifier 15A, which is in the form of an nX volts DC signal, is input into the motion activated amplifier 15B. As shown in FIG. 4, the motion activated amplifier 15B will then increase that voltage and output a DC voltage signal having a magnitude of n(nX) volts. That DC voltage signal is provided to the on-board electronic circuitry 20 and the transmitter circuitry 25. Thus, the embodiment shown in FIG. 4 is able to provide an even greater amplification of the DC voltage signal that is generated by using the cascaded motion activated energy amplifiers 15A and 15B. While only two cascaded motion activated amplifiers 15A and 15B are shown in FIG. 4, it should be understood that that is meant to be exemplary only, and that three or more cascaded motion activated amplifiers 15 may also be employed.

Figure 5:
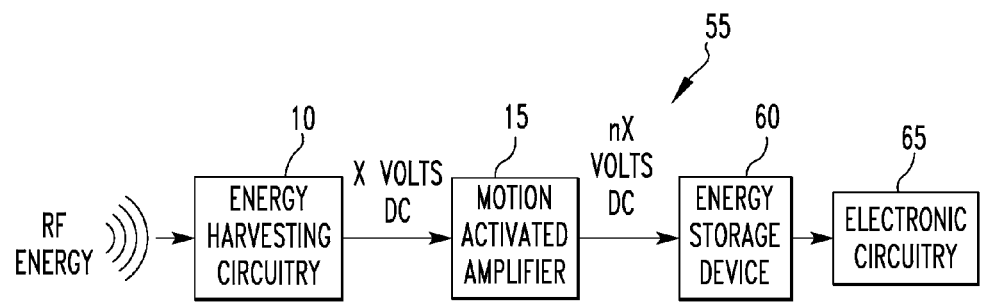
FIG. 5 is a block diagram of a wireless electronic device according to an alternate embodiment of the invention.
Figure 6:
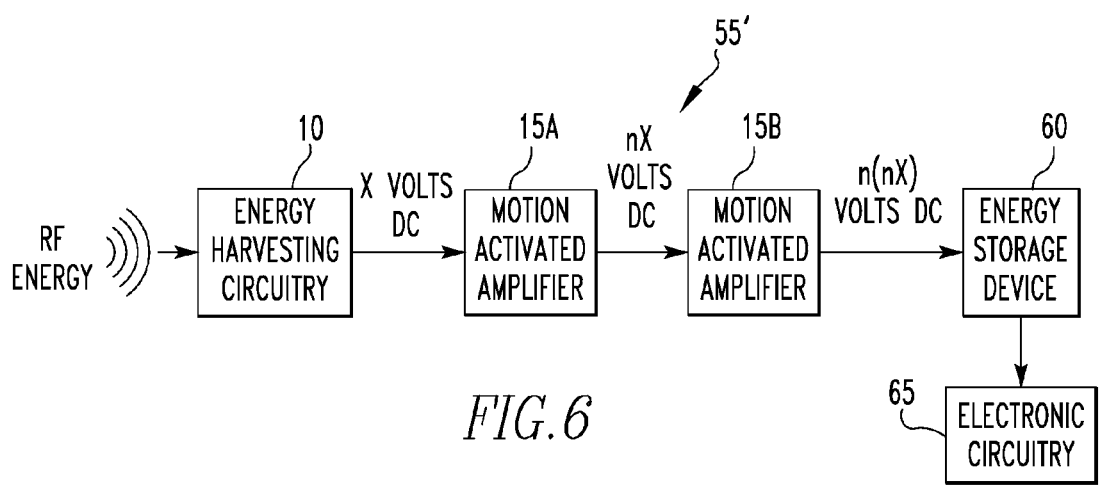
FIG. 6 is a block diagram of a wireless electronic device according to a further alternate embodiment of the invention.

FIG. 5 is a block diagram of a wireless electronic device 55 according to an alternate embodiment of the invention. The wireless electronic device 55 includes energy harvesting circuitry 10 operatively coupled to a motion activated amplifier 15 as described elsewhere herein. The motion activated amplifier 15 is operatively coupled to an energy storage device 60, such as a conventional capacitor, a supercapacitor, or a rechargeable battery, such that it receives the nX volt DC signal that is output by the motion activated amplifier 15. As such, the combination of the energy harvesting circuitry 10 and the motion activated amplifier 15 is employed to charge the energy storage device 60, which in turn provides power to the electronic circuitry 65, which may include on-board electronic circuitry 20 and transmitter circuitry 25 as described elsewhere herein. FIG. 6 is a block diagram of a wireless electronic device 55' according to a further alternate embodiment of the invention that is similar to the wireless electronic device 55 except that it employs cascaded motion activated amplifiers 15A and 15B (or more) in a manner similar to that shown in FIG. 4.

As will be appreciated, the embodiments shown in FIGS. 5 and 6 provide for amplified DC voltage levels to be provided to the energy storage device 60. Without such amplification (i.e., merely using energy harvested using energy harvesting circuitry 10), it may be difficult to store energy in an energy storage device 60 as energy storage devices 60 such as capacitors, supercapacitors and batteries often require relatively high voltage levels for charging. In the case of capacitors, for a given capacitor, the amount of charge that can be stored is given by $q=CV$, where given the capacitor size, C, the voltage that is being used to accumulate the charge must be greater than the voltage already present on the capacitor. Thus, the more energy that is stored on the capacitor, the more difficult it is to store additional energy on the capacitor, which can be a problem considering the low field strength levels of a normal ambient source of RF energy. The use of one or more motion activated amplifiers 15 enables the required, elevated voltage levels to be generated for charging purposes.

Figure 7:
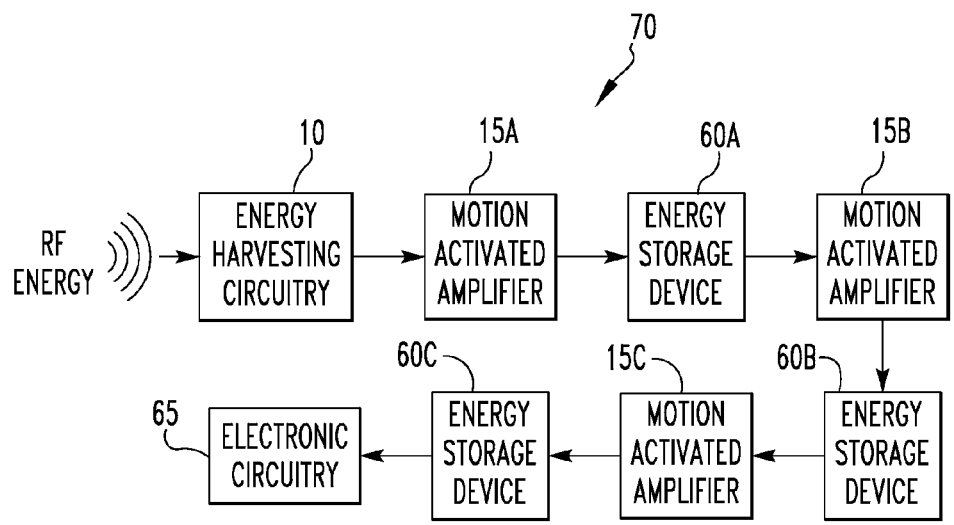
FIG. 7 is a block diagram of a wireless electronic device according to yet a further alternate embodiment of the invention.

FIG. 7 is a block diagram of a wireless electronic device 70 according to yet a further alternate embodiment of the invention. As seen in FIG. 7, the wireless electronic device 70 includes energy harvesting circuitry 10 for receiving RF energy and converting it into a DC voltage signal. In addition, the wireless electronic device 70 includes successive stages of energy storage devices 60A, 60B, and 60C (preferably each being a capacitor) of increasing storage capacity (60C>60B>60A), with each one being preceded by a respective motion activated amplifier 15A, 15B, 15C for charging the associated energy storage device 60A, 60B, and 60C. The performance and operation of the motion activated amplifier 15 of FIG. 1 is based on the turns ratio in transformer action and requires sufficient current to generate the necessary flux linking the primary and secondary, and the primary goal of the motion activated amplifier 15 is voltage gain. Such gain in and of itself may not be sufficient to sustain the ultimate desired voltage. The configuration of the wireless electronic device 70 provides the ability in each stage to store charge over a non-zero interval of time, which in turn will provide additional charge that can be translated into current to provide sufficient flux for the next stage. The motion activated amplifier 15 provides the voltage gain through the transformer action, and the accumulating of charge over time produces the current sufficient to drive the transformer. Thus, it will be appreciated that the optimum implementation of the motion activated amplifier 15 will require design with tradeoffs among desired voltage, accumulated charge in time, and the number of stages of amplification required. As indicated, the q=C V relationship limits the voltage levels that can actually charge the capacitor. Thus, in the wireless electronic device 70 there is a strategy of using time to accumulate charge to reach the voltage "gate" (level) of the next stage. The result of this series connection of motion activated amplifiers 15 is a stepping of voltages over intervals of Δtime. Once the series connection has been initialized with sufficient voltage through to the final stage, the rate of use of energy from the final stage determines the time interval, Δ. In the wireless electronic device 70 embodiment, the choice of Δ, and the number of total stages are chosen so as to optimize the rate of charging for the specified voltage level. Ultimately, the energy storage device 60C is operatively coupled to and provides power to electronic circuitry 65, which is a describe elsewhere herein.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. An electronic device, comprising:
a motion activated amplifier structured to receive a first DC signal having a first DC voltage level and output a second DC signal having a second DC voltage level that is greater than said first DC voltage level;
said motion activated amplifier including a motion activated switch operatively coupled to transformer/rectifier circuitry, said motion activated switch being structured to receive said first DC signal and in response to said electronic device being moved output an AC signal by chopping said first DC signal to produce said AC signal responsive to said electronic device being moved, wherein said chopping results from said motion activated switch providing alternating conducting and non-conducting paths between a source of said first DC signal and said transformer/rectifier circuitry responsive to said electronic device being moved, said transformer/rectifier circuitry being structured to receive said AC signal and convert said AC signal into said second DC signal.

2. The electronic device according to claim 1, wherein said electronic device is a wireless electronic device and wherein said electronic device includes energy harvesting circuitry for receiving RF energy and converting said RF energy into said first DC signal.

3. The electronic device according to claim 2, wherein said energy harvesting circuitry includes an antenna for receiving said RF energy, a matching network operatively coupled to said antenna, and a charge pump operatively coupled to said matching network for converting said RF energy into said first DC signal.

4. The electronic device according to claim 1, wherein said second DC voltage signal directly powers one or more electronic components of said electronic device.

5. The electronic device according to claim 1, wherein said second DC voltage signal charges an energy storage device, said energy storage device being structured to provide power to one or more electronic components of said electronic device.

6. An electronic device, comprising:
a motion activated amplifier structured to receive a first DC signal having a first DC voltage level and output a second DC signal having a second DC voltage level that is greater than said first DC voltage level, said motion activated amplifier including a motion activated switch operatively coupled to transformer/rectifier circuitry, said motion activated switch being structured to receive said first DC signal and in response to being moved output an AC signal, said transformer/rectifier circuitry being structured to receive said AC signal and convert said AC signal into said second DC signal; and
a second motion activated amplifier structured to receive said second DC signal and output a third DC signal having a third DC voltage level that is greater than said second DC voltage level, said second motion activated amplifier including a second motion activated switch operatively coupled to second transformer/rectifier circuitry, said second motion activated switch being structured to receive said second DC signal and in response to being moved output a second AC signal, said second transformer/rectifier circuitry being structured to receive said second AC signal and convert said second AC signal into said third DC signal.

7. The electronic device according to claim 6, wherein said electronic device is a wireless electronic device and wherein said electronic device includes energy harvesting circuitry for receiving RF energy and converting said RF energy into said first DC signal.

8. The electronic device according to claim 6, wherein said third DC voltage signal directly powers one or more electronic components of said electronic device.

9. The electronic device according to claim 6, wherein said third DC voltage signal charges an energy storage device, said energy storage device being structured to provide power to one or more electronic components of said electronic device.

10. An electronic device, comprising:
a motion activated amplifier structured to receive a first DC signal having a first DC voltage level and output a second DC signal having a second DC voltage level that is greater than said first DC voltage level, said motion activated amplifier including a motion activated switch operatively coupled to transformer/rectifier circuitry, said motion activated switch being structured to receive said first DC signal and in response to being moved output an AC signal, said transformer/rectifier circuitry being structured to receive said AC signal and convert said AC signal into said second DC signal, wherein said second DC voltage signal charges a first energy storage device; and
a second motion activated amplifier structured to receive a third DC signal having a third DC voltage level from said first energy storage device and output a fourth DC signal having a fourth DC voltage level that is greater than said third DC voltage level, said second motion activated amplifier including a second motion activated switch operatively coupled to second transformer/rectifier circuitry, said second motion activated switch being structured to receive said third DC signal and in response to being moved output a second AC signal, said second transformer/rectifier circuitry being structured to receive said second AC signal and convert said second AC signal into said fourth DC signal, wherein said fourth DC voltage signal charges a second energy storage device.

11. A method of generating a voltage signal, comprising:

receiving a first DC signal having a first DC voltage level;

converting said first DC signal into an AC signal based on and in response to motion by chopping said first DC signal to produce said AC signal responsive to said motion, wherein said chopping results from providing alternating conducting and non-conducting paths for said first DC signal responsive to said motion; and converting said AC signal into a second DC signal having a second DC voltage level that is greater than said first DC voltage level.

12. The method according to claim 11, converting said AC signal into a second DC signal comprising stepping up a voltage of said AC signal to create a stepped-up AC signal, and rectifying said stepped-up AC signal to create said second DC signal.

13. The method according to claim 11, further comprising receiving RF energy and converting said RF energy into said first DC signal.

\* \* \* \* \*

UNITED STATES PATENT AND TRADEMARK OFFICE
CERTIFICATE OF CORRECTION

PATENT NO. : 8,213,201 B2  Page 1 of 1
APPLICATION NO. : 12/481899
DATED : July 3, 2012
INVENTOR(S) : Marlin H. Mickle et al.

It is certified that error appears in the above-identified patent and that said Letters Patent is hereby corrected as shown below:

Title page, first column, Item (73), Assignee, "Systems" should read --System--.
Title page, second column, Item (56), U.S. PATENT DOCUMENTS, "7,317,303 B1   1/2008 Devilbliss et al." should read --7,317,303 B1   1/2008 DeVilbiss--.
In the Specification:
Column 1, line 23, "an wireless" should read --a wireless--.
Column 2, line 60, "energy form" should read --energy from--.
Column 5, line 40, "conducing" should read --conducting--.
Column 7, line 19, "a describe" should read --described--.

Signed and Sealed this
Fourth Day of June, 2013

Teresa Stanek Rea
*Acting Director of the United States Patent and Trademark Office*